(12) United States Patent
Hashizume et al.

(10) Patent No.: US 7,184,232 B2
(45) Date of Patent: Feb. 27, 2007

(54) APPARATUS AND METHOD FOR DRIVING A WRITE HEAD

(75) Inventors: Motomu Hashizume, Tokyo (JP); Jinguji Naoko, Tokyo (JP); Indumini Ranmuthu, Plano, TX (US); Neel Seshan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 244 days.

(21) Appl. No.: 10/665,324

(22) Filed: Sep. 18, 2003

(65) Prior Publication Data

US 2005/0073340 A1    Apr. 7, 2005

(51) Int. Cl.
G11B 5/09 (2006.01)
G11B 5/02 (2006.01)

(52) U.S. Cl. .................... 360/46; 360/68; 327/110
(58) Field of Classification Search ................ None
See application file for complete search history.

(56) References Cited

U.S. PATENT DOCUMENTS

| | | | | |
|---|---|---|---|---|
| 4,551,772 A | | 11/1985 | Sliger | |
| 5,291,069 A | * | 3/1994 | Gooding et al. | 327/482 |
| 5,296,975 A | * | 3/1994 | Contreras et al. | 360/46 |
| 5,386,328 A | * | 1/1995 | Chiou et al. | 360/68 |
| 5,668,676 A | * | 9/1997 | Voorman et al. | 360/46 |
| 6,496,317 B2 | * | 12/2002 | Lacombe | 360/68 |
| 6,512,649 B1 | * | 1/2003 | Alini et al. | 360/68 |
| 6,831,800 B2 | * | 12/2004 | Ranmuthu | 360/68 |
| 6,909,264 B2 | * | 6/2005 | Del Gatto et al. | 323/268 |
| 6,927,933 B2 | * | 8/2005 | Choi et al. | 360/68 |
| 2004/0196581 A1 | * | 10/2004 | VanEaton et al. | 360/46 |
| 2004/0196582 A1 | * | 10/2004 | VanEaton et al. | 360/46 |
| 2005/0007686 A1 | * | 1/2005 | Bloodworth et al. | 360/67 |

* cited by examiner

*Primary Examiner*—Andrea Wellington
*Assistant Examiner*—Dan I Davidson
(74) *Attorney, Agent, or Firm*—W. James Brady, III; Frederick J. Telecky, Jr.

(57) ABSTRACT

An apparatus for driving a write head in response to a data signal includes: (a) a first drive unit coupled with the write head; (b) a second drive unit coupled with the write head; and (c) a control unit coupled with the first and second drive units. The control unit receives the data signal and generates control signals to the first drive and second drive units in response to the data signal. The control signals control the first drive unit to apply a first drive signal to a first write head side in a first signal polarity and control the second drive unit to apply a second drive signal to the a second write head side in a second signal polarity opposite to the first signal polarity when the data signal effects a signal excursion. The first drive signal and the second drive signal are equal in magnitude time coincident.

8 Claims, 2 Drawing Sheets

APPARATUS AND METHOD FOR DRIVING A WRITE HEAD

BACKGROUND OF THE INVENTION

The present invention is directed to apparatuses and methods for driving write heads in memory devices, and especially to write driver apparatuses and methods providing symmetry in drive signals.

The construction of read/write heads in memory devices, such as hard disk drive units, commonly situates electrical lines providing signals to the write head (i.e., write lines) in close proximity with electrical lines carrying read signals from the read head (i.e., read lines). Write lines are generally provided in pairs in order to provide fully differential write signaling to the write head. Similarly, read lines are generally provided in pairs in order to provide fully differential signaling from the read head.

When signals provided to a write head on two write lines are not symmetric there can be a pulse induced on the adjacent read lines. Such a pulse on the read lines can create an overvoltage condition on the read head that can result in burnout of the read head. This problem has been addressed in the past by treating the symptom—the pulse induced in the read lines—rather than dealing with the cause—asymmetric signals on the write lines. For example, one solution has been to turn off bias signals to the read head while performing a write operation. This avoided adding the induced pulse to the read bias signal and therefore reduced the likelihood of an overvoltage condition in the read head. Another prior art solution was to simply place the write lines and the read lines further apart, thereby limiting signal levels that may be induced on the read lines by asymmetry in write signals.

The prior art solutions' addressing the symptom (i.e., pulses induced on the read lines) rather than the cause (i.e., asymmetry in the write signals) became less effective as the size of the memory devices shrank. Another cause of reduced effectiveness of the prior art solutions was the increasing the capacity of storage in disc storage devices that resulted in denser storage of data. Sensitivity of read heads necessarily followed higher data storage density in order that the read head could distinguish among individual data units closely situated on a disc because of the denser storage of data on the disc.

Symmetric signals on write lines assure no pulse is induced on nearby read lines. Symmetry requires complementary signaling in the differential signaling provided to a write head. That is, each signal must be equal in magnitude and opposite in polarity to assure an algebraic zero in total effect of the signals on nearby read lines. Said another way, each of the two differential signals provided to the write lines must be a mirror image of the other signal; the signals must be complementary signals.

There is a need for an apparatus and method for driving a write head that provides complementary signals to write lines in a disk storage device.

SUMMARY OF THE INVENTION

An apparatus for driving a write head in response to a data signal includes: (a) a first drive unit coupled with the write head; (b) a second drive unit coupled with the write head; and (c) a control unit coupled with the first and second drive units. The control unit receives the data signal and generates control signals to the first drive and second drive units in response to the data signal. The control signals control the first drive unit to apply a first drive signal to the write head in a first signal polarity and control the second drive unit to apply a second drive signal to the write head in a second signal polarity opposite to the first signal polarity when the data signal effects a signal excursion. The first drive signal and the second drive signal are substantially equal in magnitude.

A method for driving a write head in response to at least one data signal includes the steps of: (a) in no particular order: (1) providing a first drive unit coupled with the write head; (2) providing a second drive unit coupled with the write head; and (3) providing a control unit coupled with the first drive unit and the second drive unit; and (b) operating the control unit to receive the at least one data signal and generate control signals to the first drive unit and the second drive unit in response to the at least one data signal; the control signals controlling the first drive unit to apply at least one first drive signal to the write head in a first signal polarity and controlling the second drive unit to apply at least one second drive signal to the write head in a second signal polarity opposite to the first signal polarity when the at least one data signal effects a signal excursion; the at least one first drive signal and the at least one second drive signal being substantially equal in magnitude.

It is, therefore, an object of the present invention to provide an apparatus and method for driving a write head that provides complementary signals to write lines in a disk storage device Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
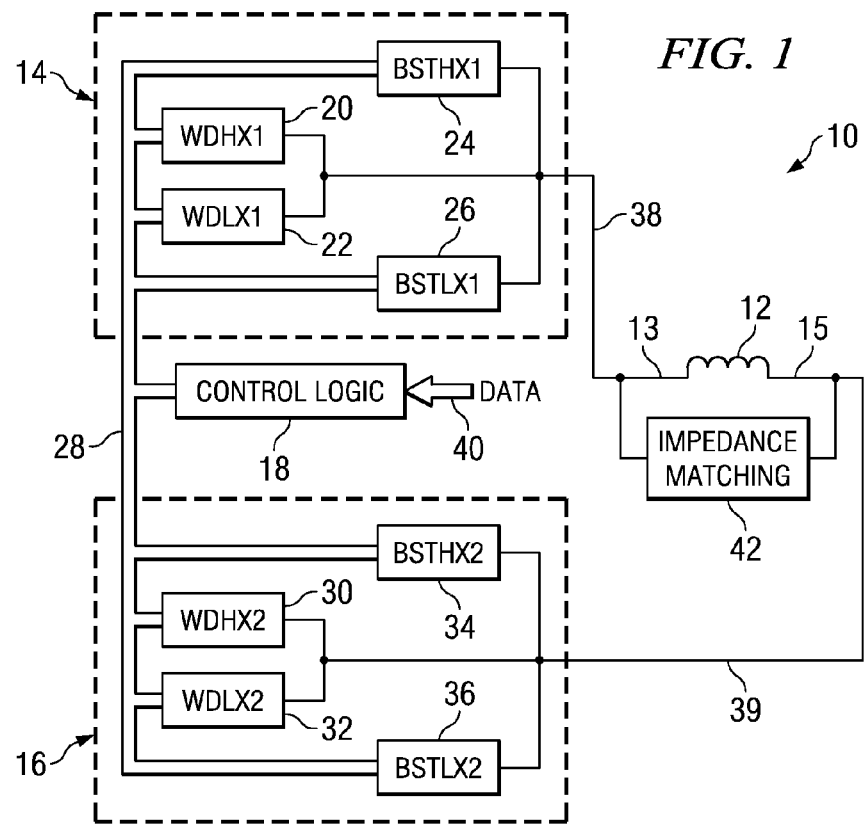
FIG. 1 is a block diagram illustrating the preferred embodiment of the apparatus of the present invention.

FIG. 1 is a block diagram illustrating the preferred embodiment of the apparatus of the present invention. In FIG. 1, an apparatus 10 for driving a write head 12 includes a first drive unit 14, a second drive unit 16 and a control unit 18. Control unit 18 is coupled with drive units 14, 16 via a network 28.

First drive unit 14 includes a high DC write (direct current) signal (WDHX1) source 20, a low DC write signal (WDLX1) source 22, a high boost signal (BSTHX1) source 24 and a low boost signal (BSTLX1) source 26. First drive unit 14 responds to control unit 18 to selectively provide drive signals to a first connection locus 13 of write head 12. Second drive unit 16 includes a high DC write (direct current) signal (WDHX2) source 30, a low DC write signal (WDLX2) source 32, a high boost signal (BSTHX2) source 34 and a low boost signal (BSTLX2) source 36. Second drive unit 16 responds to control unit 18 to selectively provide drive signals to a second connection locus 15 of write head 12. Control unit 18 receives data signals 40 and responds to those received data signals to select which signal sources 20, 22, 24, 26, 30, 32, 34, 36 should be activated for providing a signal to write head 12. DC write signals and boost signals are provided by signal sources 20, 22, 24, 26 to connection locus 13 via a network 38. DC write signals and boost signals are provided by signal sources 30, 32, 34, 36 to connection locus 15 via a network 39. An impedance matching circuit or unit 42 is preferably coupled across write head 12 to match impedance of write head 12 with other components of apparatus 10.

For example, if a data signal 40 is received by control unit 18 indicating a signal excursion in a direction that should be represented by a high write signal, then control unit 18 will enable high write DC signal source 20 and high boost signal source 24 for application of a high DC write signal and a high boost signal at connection locus 13 of write head 12. At substantially the same time control unit 18 will enable low DC write signal source 32 and low boost signal source 36 for application of a low DC write signal and a low boost signal at connection locus 15 of write head 12. So long as DC signals and boost signals applied to connection loci 13, 15 are equal in magnitude and opposite in polarity, no pulse will be induced in adjacent read lines (not shown in FIG. 1).

By way of further example, if a data signal 40 is received by control unit 18 indicating a signal excursion in a direction that should be represented by a low write signal, then control unit 18 will enable low write DC signal source 22 and low boost signal source 26 for application of a low DC write signal and a low boost signal at connection locus 13 of write head 12. At substantially the same time control unit 18 will enable high DC write signal source 30 and high boost signal source 34 for application of a high DC write signal and a high boost signal at connection locus 15 of write head 12. So long as DC signals and boost signals applied to connection loci 13, 15 are equal in magnitude and opposite in polarity, no pulse will be induced in adjacent read lines (not shown in FIG. 1).

The application of signals at opposing ends (i.e., connection loci 13, 15) of write head 12 that are of equal magnitude and opposite polarity further enhances the speed of signal switching and accuracy of signal discrimination across write head 12.

Figure 2:
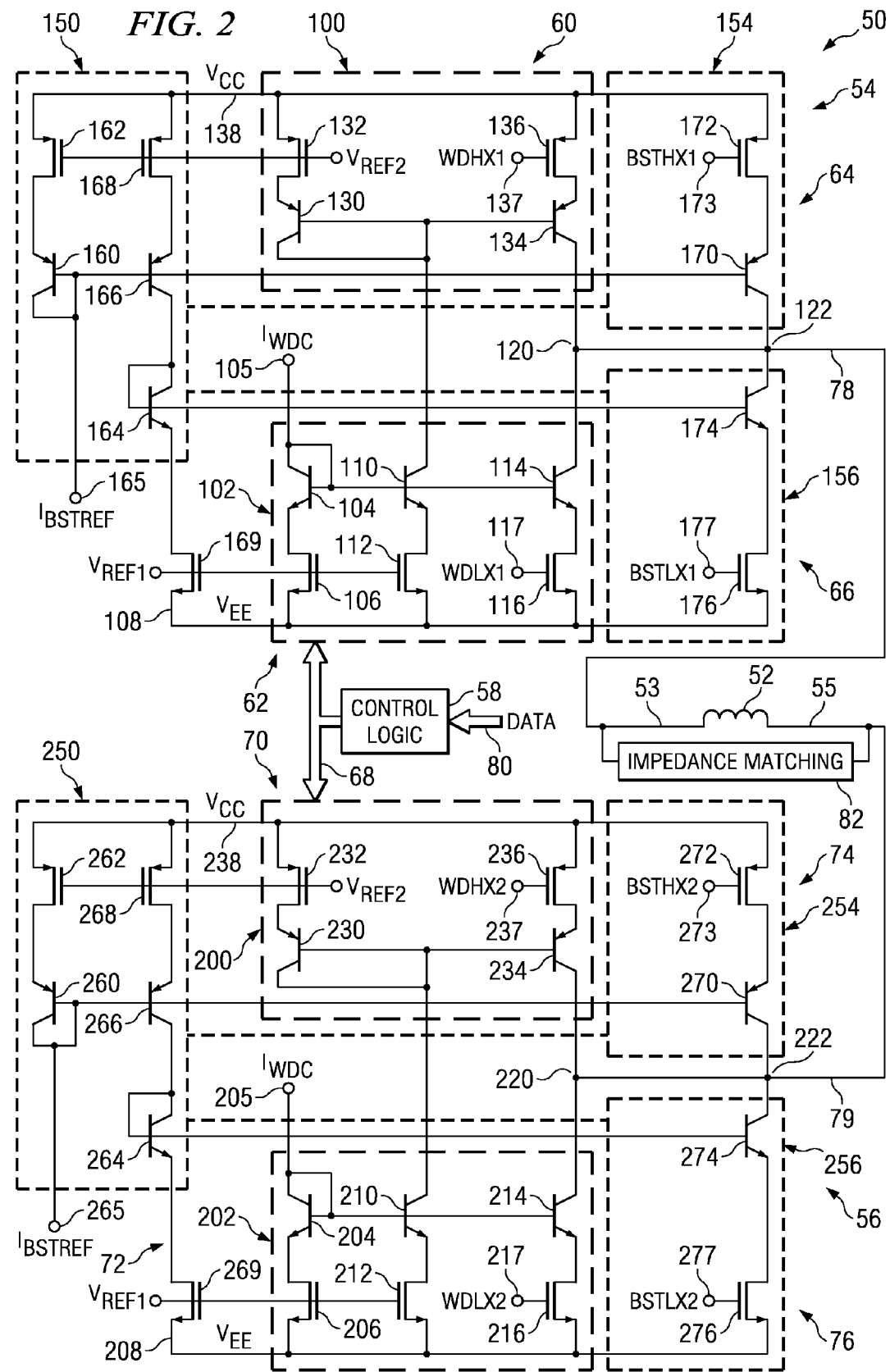
FIG. 2 is an electrical schematic diagram illustrating the preferred embodiment of the apparatus of the present invention.

FIG. 2 is an electrical schematic diagram illustrating the preferred embodiment of the apparatus of the present invention. In FIG. 2, an apparatus 50 for driving a write head 52 includes a first drive unit 54, a second drive unit 56 and a control unit 58. Control unit 58 is coupled with drive units 54, 56 via a network 68. Details of connection of network 68 to interior loci within drive units 54, 56 are omitted to avoid cluttering FIG. 2; those connection details will be described in detail hereinafter.

First drive unit 54 includes a high DC write (direct current) signal (WDHX1) source 60, a low DC write signal (WDLX1) source 62, a high boost signal (BSTHX1) source 64 and a low boost signal (BSTLX1) source 66. First drive unit 54 responds to control unit 58 to selectively provide drive signals to a first connection locus 53 of write head 52. Second drive unit 56 includes a high DC write (direct current) signal (WDHX2) source 70, a low DC write signal (WDLX2) source 72, a high boost signal (BSTHX2) source 74 and a low boost signal (BSTLX2) source 76. Second drive unit 56 responds to control unit 58 to selectively provide drive signals to a second connection locus 55 of write head 52.

High DC write signal source 60 is embodied in a first logic level current mirror 100. Low DC write signal source 62 is embodied in a second logic level current mirror 102.

Current mirror 102 includes a diode-coupled transistor 104 in series with a transistor 106 between a signal input locus 105 and a lower voltage supply line 108 maintained substantially at a lower supply voltage $V_{EE}$. A direct current (DC) signal $I_{WDC}$ is applied at signal input locus 105. Signal $I_{WDC}$ establishes the direct current signal level for effecting data indications in write head 52. Current mirror 102 further includes transistors 110, 112 coupled in series between current mirror 100 and lower voltage supply line 108 and transistors 114, 116 coupled in series between current mirror 100 and lower voltage supply line 108. Preferably transistors 104, 110, 114 are bipolar transistors and transistors 106, 112, 116 are metal oxide silicon (MOS) transistors. A bias signal $V_{REF1}$ gates transistors 106, 112 so that current signal $I_{WDC}$ is permitted to flow through transistors 104, 106. That causes current signal $I_{WDC}$ to be mirrored (biased toward lower voltage signal $V_{EE}$) in the circuit segment including transistors 110, 112. Transistor 116 is gated by control unit 58 in response to data signals 80 applying a gating signal WDLX1 to gate locus 117 via network 68 (not shown in detail in FIG. 2) so that current signal $I_{WDC}$ (biased toward lower voltage signal $V_{EE}$) also is mirrored in the circuit segment including transistors 114, 116. When control unit 58 gates transistor 116 to conduct, current signal $I_{WDC}$ (biased toward lower voltage signal $V_{EE}$) is applied via junctions 120, 122 and network 78 to first connection locus 53 of write head 52.

Current mirror 100 includes a diode-coupled transistor 130 in series with a transistor 132 between current mirror 102 and an upper voltage supply line 138 maintained substantially at an upper supply voltage $V_{CC}$. Preferably transistors 130, 134 are bipolar transistors and transistors 132, 136 are metal oxide silicon (MOS) transistors. As described earlier herein, direct current (DC) signal $I_{WDC}$ flows in the circuit segment including transistors 110, 112. A bias signal $V_{REF2}$ gates transistor 132 so that current signal $I_{WDC}$ is permitted to flow through transistors 130, 132. Transistor 136 is gated by control unit 58 in response to data signals 80 applying a gating signal WDHX1 to gate locus 137 via network 68 (not shown in detail in FIG. 2) so that, current signal $I_{WDC}$ (biased toward upper voltage signal $V_{CC}$) also is mirrored in the circuit segment including transistors 134, 136. When control unit 58 gates transistor 136 to conduct, current signal $I_{WDC}$ (biased toward upper voltage signal $V_{CC}$) is applied via junctions 120, 122 and network 78 to first connection locus 53 of write head 52.

High boost signal source 64 is embodied in a primary current mirror component 150 operating with a secondary current mirror component 154 (a first boost current mirror). Low boost signal source 66 is embodied in primary current mirror component 150 operating with a secondary current mirror component 156 a second boost current mirror.

Primary current mirror component 150 includes a diode-coupled transistor 160 in series with a transistor 162 between a signal input locus 165 and an upper voltage supply line 138 maintained substantially at an upper supply voltage $V_{CC}$. A boost current reference signal $I_{BSTREF}$ is applied at signal input locus 165. Boost signal $I_{BSTREF}$ establishes the boost signal level for effecting data indications in write head 52. Current mirror component 150 further includes a diode connected transistor 164 coupled in series with transistors 166, 168 between lower voltage supply line 108 and upper voltage supply line 138 via a transistor 169. Preferably transistors 160, 164, 166 are bipolar transistors and transistors 162, 168, 169 are metal oxide silicon (MOS) transistors. Transistors 162, 168 are gated by bias signal $V_{REF2}$. Bias signal $V_{REF1}$ gates transistor 169 so that boost signal $I_{BSTREF}$ is permitted to flow through transistors 164,

166, 168, 169. Transistors 160, 162, 166, 168 cooperate to mirror boost signal $I_{BSTREF}$ (biased toward upper voltage signal $V_{CC}$) to flow through transistors 170, 172 when transistor 172 is gated to conduct. Transistor 164 cooperates with transistors 160, 162, 166, 168 cooperate to mirror boost signal $I_{BSTREF}$ (biased toward lower voltage signal $V_{EE}$) to flow through transistors 174, 176 when transistor 176 is gated to conduct. Transistor 176 is gated by control unit 58 in response to data signals 80 applying a gating signal BSTLX1 to gate locus 117 via network 68 (not shown in detail in FIG. 2) so that boost signal $I_{BSTREF}$ (biased toward lower voltage signal $V_{EE}$) flows through transistors 174, 176 and is applied via junction 122 and network 78 to first connection locus 53 of write head 52. Transistor 172 is gated by control unit 58 in response to data signals 80 applying a gating signal BSTHX1 to gate locus 173 via network 68 (not shown in detail in FIG. 2) so that boost signal $I_{BSTREF}$ (biased toward higher voltage signal $V_{CC}$) flows through transistors 170, 172 and is applied via junction 122 and network 78 to first connection locus 53 of write head 52.

Second drive unit 56 includes a high DC write (direct current) signal (WDHX2) source 70, a low DC write signal (WDLX2) source 72, a high boost signal (BSTHX2) source 74 and a low boost signal (BSTLX2) source 76. Second drive unit 56 responds to control unit 58 to selectively provide drive signals to a second connection locus 55 of write head 52.

High DC write signal source 70 is embodied in a current mirror 200. Low DC write signal source 72 is embodied in a current mirror 202. Current mirror 202 includes a diode-coupled transistor 204 in series with a transistor 206 between a signal input locus 205 and a lower voltage supply line 208 maintained substantially at a lower supply voltage $V_{EE}$. A direct current (DC) signal $I_{WDC}$ is applied at signal input locus 205. Signal $I_{WDC}$ establishes the direct current signal level for effecting data indications in write head 52. Current mirror 202 further includes transistors 210, 212 coupled in series between current mirror 200 and lower voltage supply line 208 and transistors 214, 216 coupled in series between current mirror 200 and lower voltage supply line 208. Preferably transistors 204, 210, 214 are bipolar transistors and transistors 206, 212, 216 are metal oxide silicon (MOS) transistors. A bias signal $V_{REF1}$ gates transistors 206, 212 so that current signal $I_{WDC}$ is permitted to flow through transistors 204, 206. That causes current signal $I_{WDC}$ to be mirrored (biased toward lower voltage signal $V_{EE}$) in the circuit segment including transistors 210, 212. Transistor 216 is gated by control unit 58 in response to data signals 80 applying a gating signal WDLX2 to gate locus 217 via network 68 (not shown in detail in FIG. 2) so that current signal $I_{WDC}$ (biased toward lower voltage signal $V_{EE}$) also is mirrored in the circuit segment including transistors 214, 216. When control unit 58 gates transistor 216 to conduct, current signal $I_{WDC}$ (biased toward lower voltage signal $V_{EE}$) is applied via junctions 220, 222 and network 79 to second connection locus 55 of write head 52.

Current mirror 200 includes a diode-coupled transistor 230 in series with a transistor 232 between current mirror 202 and an upper voltage supply line 238 maintained substantially at an upper supply voltage $V_{CC}$. Preferably transistors 230, 234 are bipolar transistors and transistors 232, 236 are metal oxide silicon (MOS) transistors. As described earlier herein, direct current (DC) signal $I_{WDC}$ flows in the circuit segment including transistors 210, 212. A bias signal $V_{REF2}$ gates transistor 232 so that current signal $I_{WDC}$ is permitted to flow through transistors 230, 232. Transistor 236 is gated by control unit 58 in response to data signals 80 applying a gating signal WDHX2 to gate locus 237 via network 68 (not shown in detail in FIG. 2) so that, current signal $I_{WDC}$ (biased toward upper voltage signal $V_{CC}$) also is mirrored in the circuit segment including transistors 234, 236. When control unit 58 gates transistor 236 to conduct, current signal $I_{WDC}$ (biased toward upper voltage signal $V_{CC}$) is applied via junctions 220, 222 and network 79 to second connection locus 55 of write head 52.

High boost signal source 74 is embodied in a primary current mirror component 250 operating with a secondary current mirror component 252 (a first boost current mirror). Low boost signal source 76 is embodied in primary current mirror component 250 operating with a secondary current mirror component 256 (a second boost current mirror).

Primary current mirror component 250 includes a diode-coupled transistor 260 in series with a transistor 262 between a signal input locus 265 and an upper voltage supply line 238 maintained substantially at an upper supply voltage $V_{CC}$. A boost current reference signal $I_{BSTREF}$ is applied at signal input locus 265. Boost signal $I_{BSTREF}$ establishes the boost signal level for effecting data indications in write head 52. Current mirror component 250 further includes a diode connected transistor 264 coupled in series with transistors 266, 268 between lower voltage supply line 208 and upper voltage supply line 238 via a transistor 269. Preferably transistors 260, 264, 266 are bipolar transistors and transistors 262, 268, 269 are metal oxide silicon (MOS) transistors. Transistors 262, 268 are gated by bias signal $V_{REF2}$. Bias signal $V_{REF1}$ gates transistor 269 so that boost signal $I_{BSTREF}$ is permitted to flow through transistors 264, 266, 268, 269. Transistors 260, 262, 266, 268 cooperate to mirror boost signal $I_{BSTREF}$ (biased toward upper voltage signal $V_{CC}$) to flow through transistors 270, 272 when transistor 272 is gated to conduct. Transistor 264 cooperates with transistors 260, 262, 266, 268 cooperate to mirror boost signal $I_{BSTREF}$ (biased toward lower voltage signal $V_{EE}$) to flow through transistors 274, 276 when transistor 276 is gated to conduct. Transistor 276 is gated by control unit 58 in response to data signals 80 applying a gating signal BSTLX2 to gate locus 217 via network 68 (not shown in detail in FIG. 2) so that boost signal $I_{BSTREF}$ (biased toward lower voltage signal $V_{EE}$) flows through transistors 274, 276 and is applied via junction 222 and network 79 to second connection locus 55 of write head 52. Transistor 272 is gated by control unit 58 in response to data signals 80 applying a gating signal BSTHX2 to gate locus 273 via network 68 (not shown in detail in FIG. 2) so that boost signal $I_{BSTREF}$ (biased toward higher voltage signal $V_{CC}$) flows through transistors 270, 272 and is applied via junction 222 and network 79 to second connection locus 55 of write head 52.

Control unit 58 receives data signals 80 and responds to those received data signals to select which of transistors 116, 136, 172, 176, 216, 236, 272, 276 should be activated for providing a signal to write head 52. DC write signals and boost signals are provided to connection locus 53 via a network 78 by gating selected of transistors 116, 136, 172, 176. DC write signals and boost signals are provided to connection locus 55 via a network 79 by gating selected of transistors 216, 236, 272, 276. An impedance matching circuit or unit 82 is preferably coupled across write head 52 to match impedance of write head 52 with other components of apparatus 50.

For example, if a data signal 80 is received by control unit 58 indicating a signal excursion in a direction that should be represented by a high write signal, then control unit 58 will gate transistor 136 and transistor 172 to effect application of a high DC write signal and a high boost signal at connection locus 53 of write head 52. At substantially the same time control unit 58 will gate transistor 216 and transistor 276 to effect application of a low DC write signal and a low boost signal at connection locus 55 of write head 52. Since DC signals and boost signals applied to connection loci 53, 55 are equal in magnitude and opposite in polarity, no pulse will be induced in adjacent read lines (not shown in FIG. 2).

By way of further example, if a data signal 80 is received by control unit 58 indicating a signal excursion in a direction that should be represented by a low write signal, then control unit 58 will gate transistor 116 and transistor 176 to effect application of a low DC write signal and a low boost signal at connection locus 53 of write head 52. At substantially the same time control unit 58 will gate transistor 236 and transistor 272 to effect application of a high DC write signal and a high boost signal at connection locus 55 of write head 52. So long as DC signals and boost signals applied to connection loci 53, 55 are equal in magnitude and opposite in polarity, no pulse will be induced in adjacent read lines (not shown in FIG. 2).

The application of signals at opposing ends (i.e., connection loci 53, 55) of write head 52 that are of equal magnitude and opposite polarity further enhances the speed of signal switching and accuracy of signal discrimination across write head 52. The inventors have incorporated emitter switching in the preferred embodiment of the apparatus of the present invention (FIG. 2) because such emitter switching aids in presenting complementary signals. The use of emitter switching permits easier control of shapes of waveforms during operation.

Figure 3:
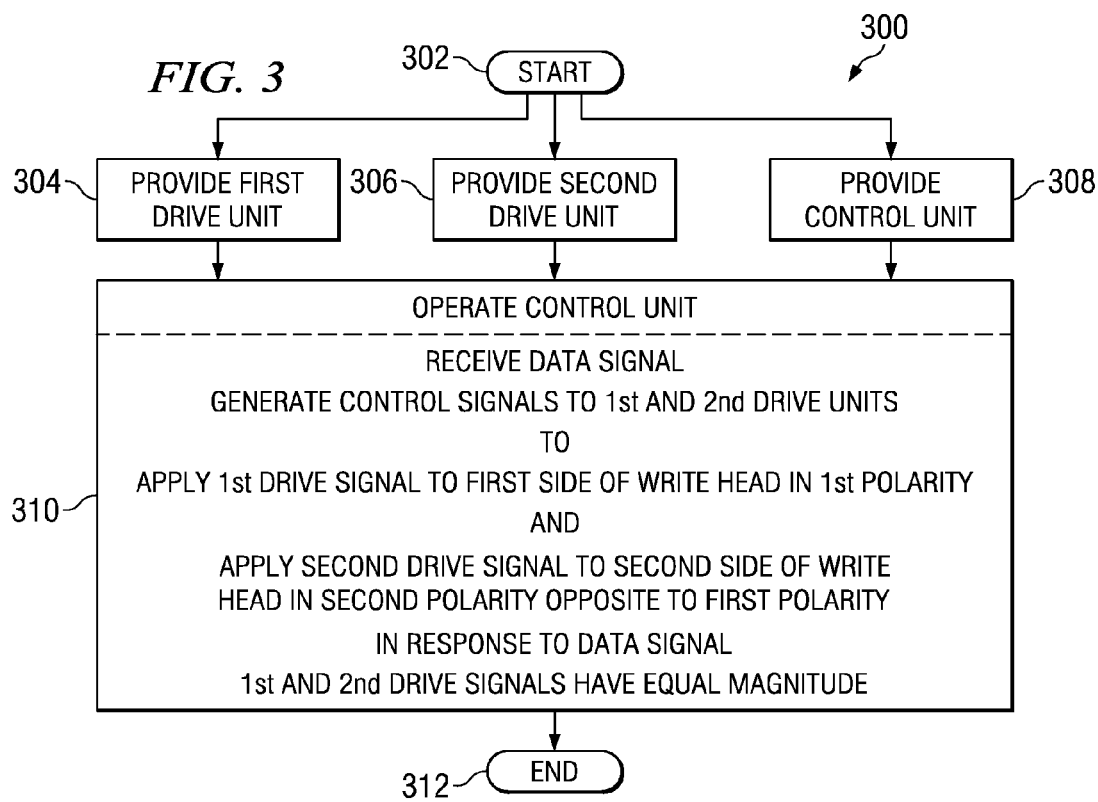
FIG. 3 is a flow diagram illustrating the preferred embodiment of the method of the present invention.

FIG. 3 is a flow diagram illustrating the preferred embodiment of the method of the present invention. In FIG. 3, a method 300 for driving a write head in response to at least one data signal begins at a START locus 302. Method 300 continues with the step of: (a) in no particular order: (1) providing a first drive unit coupled with the write head, as indicated by a block 304; (2) providing a second drive unit coupled with the write head, as indicated by a block 306; and (3) providing a control unit coupled with the first drive unit and the second drive unit, as indicated by a block 308.

Method 300 continues with the step of (b) operating the control unit to receive the at least one data signal and generate control signals to the first drive unit and the second drive unit in response to the at least one data signal, as indicated by a block 310. The control signals control the first drive unit to apply at least one first drive signal to one side of write head in a first signal polarity and control the second drive unit to apply at least one second drive signal to the other side of the write head in a second signal polarity opposite to the first signal polarity when the at least one data signal effects a signal excursion. The at least one first drive signal and the at least one second drive signal are substantially equal in magnitude. Method 300 terminates at an END locus 312.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for effecting symmetric driving of a write head, the apparatus comprising:
   (a) a first drive unit coupled with a first connection locus of said write head;
   (b) a second drive unit coupled with a second connection locus of said write head; and
   (c) a control unit coupled with said first drive unit and said second drive unit;
   said control unit effecting complementary coordination by said first and second drive units to provide a first drive signal from said first drive unit at said first connection locus and a second drive signal from said second drive unit at said second connection locus, said first and second drive signals in substantially equal magnitudes and of opposite polarities during respective time intervals of operation of said write head,
   wherein said first drive unit comprises at least one first current mirror structure and said second drive unit comprises at least one second current mirror structure substantially similar to said at least one first current mirror structure, and wherein said first and second drive signals include a boost signal.

2. An apparatus for effecting symmetric driving of a write head as recited in claim 1 wherein said first and second drive signals include a direct current signal.

3. An apparatus for effecting symmetric driving of a write head as recited in claim 2 wherein said respective time intervals of operation are intervals of a digital data signal.

4. An apparatus for effecting symmetric driving of a write head as recited in claim 1 wherein said respective time intervals of operation are intervals of a digital data signal.

5. An apparatus for driving a write head in response to at least one data signal, the apparatus comprising:
   (a) a first drive unit coupled with said write head;
   (b) a second drive unit coupled with said write head; and
   (c) a control unit coupled with said first drive unit and said second drive unit;
   said control unit receiving said at least one data signal and generating control signals to said first drive unit and said second drive unit in response to said at least one data signal; said control signals controlling said first drive unit to apply at least one first drive signal to a first write head connection locus of said write head in a first signal polarity and controlling said second drive unit to apply at least one second drive signal to a second write head connection locus of said write head in a second signal polarity opposite to said first signal polarity when said at least one data signal effects a signal excursion; said at least one first drive signal and said at least one second drive signal being substantially equal in magnitude; said at least one first drive signal and said at least one second drive signal being applied substantially simultaneously,
   wherein each of said first drive unit and said second drive unit are substantially similar in construction and comprise: a first boost current mirror and a second boost current mirror; each of said first and second boost current mirrors being coupled to receive a boost signal; each respective boost current mirror of said first and second boost current mirrors responding to said control signals to present a boost signal level to said write head.

6. An apparatus for driving a write head in response to at least one data signal, the apparatus comprising:
   (a) a first drive unit coupled with said write head;
   (b) a second drive unit coupled with said write head; and
   (c) a control unit coupled with said first drive unit and said second drive unit;
   said control unit receiving said at least one data signal and generating control signals to said first drive unit and said second drive unit in response to said at least one data signal; said control signals controlling said first drive unit to apply at least one first drive signal to a first write head connection locus of said write head in a first signal polarity and controlling said second drive unit to apply at least one second drive signal to a second write head connection locus of said write head in a second signal polarity opposite to said first signal polarity when said at least one data signal effects a signal excursion; said at least one first drive signal and said at least one second drive signal being substantially equal in magnitude; said at least one first drive signal and said at least one second drive signal being applied substantially simultaneously, wherein said each of said first drive unit and said second drive unit are substantially similar in construction and comprise: a first logic level current mirror and a second logic level current mirror; each of said first and second logic level current mirrors being coupled to receive a direct current signal and responding to said control signals to present a direct current signal level to said write head in one of said first signal polarity or said second signal polarity, and wherein each of said first drive unit and said second drive unit comprise: a first boost current mirror and a second boost current mirror; each of said first and second boost current mirrors being coupled to receive a boost signal; each respective boost current mirror of said first and second boost current mirrors responding to said control signals to present a boost signal level to said write head in the same signal polarity as said direct current signal level.

7. A method for driving a write head in response to at least one data signal, the method comprising the steps of:
 (a) in no particular order:
  (1) providing a first drive unit coupled with said write head;
  (2) providing a second drive unit coupled with said write head; and
  (3) providing a control unit coupled with said first drive unit and said second drive unit; and
 (b) operating said control unit to receive said at least one data signal and generate control signals to said first drive unit and said second drive unit in response to said at least one data signal; said control signals controlling said first drive unit to apply at least one first drive signal to a first write head connection locus of said write head in a first signal polarity and controlling said second drive unit to apply at least one second drive signal to a second write head connection locus of said write head in a second signal polarity opposite to said first signal polarity when said at least one data signal effects a signal excursion; said at least one first drive signal and said at least one second drive signal being substantially equal in magnitude; said at least one first drive signal and said at least one second drive signal being applied substantially simultaneously, wherein each of said first drive unit and said second drive unit are substantially similar in construction and comprise: a first boost current mirror and a second boost current mirror; each of said first and second boost current mirrors being coupled to receive a boost signal; each respective boost current mirror of said first and second boost current mirrors responding to said control signals to present a boost signal level to said write head.

8. A method for driving a write head in response to at least one data signal, the method comprising the steps of:
 (a) in no particular order:
  (1) providing a first drive unit coupled with said write head;
  (2) providing a second drive unit coupled with said write head; and
  (3) providing a control unit coupled with said first drive unit and said second drive unit; and
 (b) operating said control unit to receive said at least one data signal and generate control signals to said first drive unit and said second drive unit in response to said at least one data signal; said control signals controlling said first drive unit to apply at least one first drive signal to a first write head connection locus of said write head in a first signal polarity and controlling said second drive unit to apply at least one second drive signal to a second write head connection locus of said write head in a second signal polarity opposite to said first signal polarity when said at least one data signal effects a signal excursion; said at least one first drive signal and said at least one second drive signal being substantially equal in magnitude; said at least one first drive signal and said at least one second drive signal being applied substantially simultaneously, wherein each of said first drive unit and said second drive unit are substantially similar in construction and comprise: a first logic, level current mirror and a second logic level current mirror; each of said first and second logic level current mirrors being coupled to receive a direct current signal and responding to said control signals to present a direct current signal level to said write head in one of said first signal polarity or said second signal polarity, and wherein each of said first drive unit and said second drive unit comprise: a first boost current mirror and a second boost current mirror; each of said first and second boost current mirrors being coupled to receive a boost signal; each respective boost current mirror of said first and second boost current mirrors responding to said control signals to present a boost signal level to said write head in the same signal polarity as said direct current signal level.

\* \* \* \* \*